Nov. 11, 1924.  1,515,513
H. B. MORIARTY
COMBINATION SALT AND PEPPER SHAKER
Filed Dec. 15, 1923

Inventor
Herbert B. Moriarty

By

Attorney

Patented Nov. 11, 1924.

1,515,513

UNITED STATES PATENT OFFICE.

HERBERT B. MORIARTY, OF MEMPHIS, TENNESSEE.

COMBINATION SALT AND PEPPER SHAKER.

Application filed December 15, 1923. Serial No. 680,943.

*To all whom it may concern:*

Be it known that I, HERBERT B. MORIARTY, a citizen of the United States, residing at Memphis, in the county of Shelby and State of Tennessee, have invented certain new and useful Improvements in Combination Salt and Pepper Shakers, of which the following is a specification.

My said invention relates to a combination salt and pepper shaker adapted to contain salt and pepper in separate compartments and to distribute them on articles of food either separately or simultaneously. It is an object of the invention to prevent the salt from becoming damp which condition causes the particles to stick together and fail to pass through the apertures in the top of the container.

Figure 1:
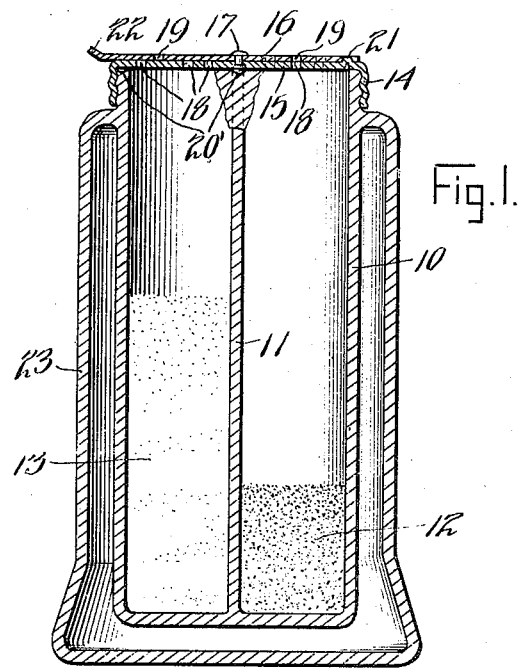

Referring to the accompanying drawings which are made a part hereof and on which similar reference characters indicate similar parts, Figure 1 is a central vertical section of my device, and

Figure 2, a plan.

Figure 3:
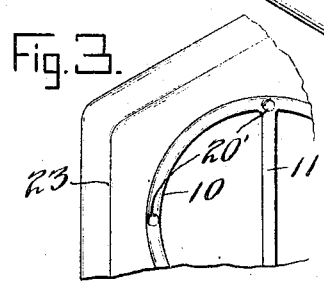

Fig. 3 is a fragmentary view showing the stop recesses.

In the drawings reference character 10 indicates the wall of a container divided by a partition 11 into two parts, one of which is here shown as containing a quantity of pepper at 12 and the other a quantity of salt at 13. The top of the container is threaded for the reception of a cap having a lower threaded rim 14 and an upper perforated portion 15. A closure 16 is centrally pivoted on the cap at 17. The cap has a group of apertures 18 above the salt compartment and a similar group above the pepper compartment. The closure has a group of apertures 19 situated above each of the compartments in the position shown in Figure 2.

The cap has a downward projection at 20 adapted to engage in either one of two recesses 20' in the upper end of the container to fix the position of the cap and prevent accidental unscrewing thereof.

The cap also has a projection 21 extending upwardly into a recess in the closure to limit the rotation thereof on the pivot 17. A handle 22 is provided whereby the closure may be moved about said pivot.

Figure 2:
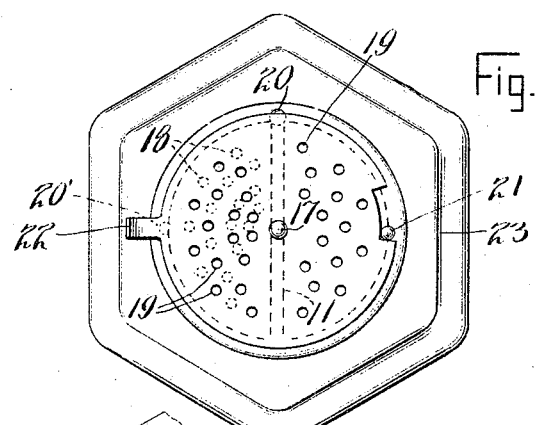

In the position of the parts indicated in Figure 2 openings 19 and 18 above the pepper compartment are in registry to permit the use of the device as a pepper shaker. When the closure is moved to the other extreme position the apertures 19 above the salt will be brought into registry with apertures 18 to permit the use of the device as a salt shaker. By turning the cap ninety degrees from the position shown so as to cause the projection 20 to engage the other projection 20' the apertures may be so positioned that pepper and salt will flow out through the cap at the same time and the quantity may be varied if the number of apertures in one group is different from the number in the other, by turning the closure 16.

An outer wall 23 spaced from the wall 10 is preferably formed integral with said wall and provides a sealed air space extending around and beneath the container. In the present embodiment of the invention this outer wall is flared outwardly at the lower end to provide an enlarged bottom for the device for the purpose of securing greater stability but this is not essential. This sealed air space tends to maintain an even temperature in the inner compartments and to prevent such an accumulation of moisture in the salt compartment as would cause the salt to become sticky or caked and thus fail to flow freely.

It will be obvious that my device may be used for other combinations of condiments or other granular substances and various modifications of structure will also be obvious to those skilled in the art, therefore I do not limit myself to what is shown in the drawings and described in the specification but only as indicated in the appended claims.

Having thus fully described my said invention, what I claim as new and desire to secure by Letters Patent, is:

1. A combination salt and pepper shaker comprising a container having a plurality of compartments open at the top, a perforated cap for said compartments, a lug on the cap engaging a recess in the upper end of the container, a pivoted closure having perforations adapted to be moved into and out of registry with those of the cap, and a hermetically sealed air space surrounding the group of compartments at the sides and bottom, substantially as set forth.

2. In a salt and pepper shaker, a container having a plurality of compartments separated by a partition, a cap for the container, a detent on one of said members engaging a recess in the other to prevent unscrewing of the cap, and a closure pivoted centrally of the cap above said partition said closure having groups of apertures adapted to register selectively with apertures in the cap above the respective compartments, substantially as set forth.

3. In a salt and pepper shaker, a container having a plurality of compartments separated by a diametrical partition, a cap for the container, a detent on one of said members engaging a recess in the other to prevent unscrewing of the cap, a closure pivoted centrally of the cap above said partition having groups of apertures adapted to register selectively with apertures in the cap above the respective compartments, and a hermetically sealed air space surrounding the sides and bottom of the container, substantially as set forth.

4. A combination container for condiments comprising a receptacle having a compartment open at one end, a perforated cap for the open end of said receptacle, a closure having perforations adapted to be moved into and out of registry with those of the cap, a protuberance on the cap for engagement with a depression in the container to prevent accidental separation thereof, and a vacuum chamber surrounding the compartment at the sides and one end, substantially as set forth.

In witness whereof, I have hereunto set my hand and seal at Memphis, Tennessee, this 12th day of December, A. D nineteen hundred and twenty-three.

HERBERT B. MORIARTY. [L. S.]

Witnesses:
   JOHN W. FARLEY,
   F. M. BAILEY.